(12) United States Patent
Shelton

(10) Patent No.: US 11,697,466 B1
(45) Date of Patent: Jul. 11, 2023

(54) MOTORCYCLE INTEGRATED SAFETY SYSTEM

(71) Applicant: Stephen Shelton, Evansville, IN (US)

(72) Inventor: Stephen Shelton, Evansville, IN (US)

( * ) Notice: Subject to any disclaimer, the term of this patent is extended or adjusted under 35 U.S.C. 154(b) by 0 days.

(21) Appl. No.: 17/482,589

(22) Filed: Sep. 23, 2021

(51) Int. Cl.
| | | |
|---|---|---|
| *B62J 27/00* | (2020.01) | |
| *G08G 1/16* | (2006.01) | |
| *B62J 45/41* | (2020.01) | |
| *B62J 45/42* | (2020.01) | |

(52) U.S. Cl.
CPC .............. *B62J 27/00* (2013.01); *B62J 45/41* (2020.02); *B62J 45/42* (2020.02); *G08G 1/166* (2013.01)

(58) Field of Classification Search
CPC . B62J 27/00; B62J 45/41; B62J 45/42; G08G 1/166
See application file for complete search history.

(56) References Cited

U.S. PATENT DOCUMENTS

| | | | |
|---|---|---|---|
| 7,532,233 B2 | 5/2009 | Chu | |
| 7,633,383 B2 * | 12/2009 | Dunsmoir | G08G 1/166 |
| | | | 348/148 |
| 7,658,256 B2 * | 2/2010 | Kobayashi | B62J 45/423 |
| | | | 180/274 |
| 9,153,133 B1 * | 10/2015 | Lunsford | G08G 1/166 |
| 9,452,801 B2 | 9/2016 | Langevin | |
| 9,699,421 B2 | 7/2017 | Ono et al. | |
| 10,377,308 B2 | 8/2019 | Savaresi et al. | |
| 2004/0143373 A1 | 7/2004 | Ennis | |
| 2008/0042812 A1 * | 2/2008 | Dunsmoir | G06V 20/582 |
| | | | 348/148 |
| 2010/0201560 A1 * | 8/2010 | Chen | G01S 7/38 |
| | | | 342/14 |
| 2013/0311075 A1 * | 11/2013 | Tran | B60W 50/14 |
| | | | 701/117 |
| 2016/0090037 A1 | 3/2016 | Tetsuka | |
| 2018/0326906 A1 * | 11/2018 | Savaresi | B62J 45/4151 |
| 2019/0172354 A1 * | 6/2019 | Hoffmann | B62J 6/056 |
| 2019/0210681 A1 * | 7/2019 | Shin | B62J 6/04 |
| 2019/0322216 A1 * | 10/2019 | Lin | B60W 50/14 |
| 2021/0197816 A1 * | 7/2021 | Horn | B62J 50/22 |
| 2021/0221368 A1 * | 7/2021 | Lavi | G06V 20/56 |
| 2021/0300497 A1 * | 9/2021 | Maeda | B62J 50/22 |

FOREIGN PATENT DOCUMENTS

| | | | | |
|---|---|---|---|---|
| CN | 106663378 A | * | 5/2017 | ............ G01S 13/931 |
| EP | 3556630 A1 | * | 10/2019 | ............ B60Q 9/008 |
| GB | 2550378 A | * | 11/2017 | ............ G08B 6/00 |
| JP | 2003306184 A | * | 10/2003 | ............ B62J 27/00 |
| KR | 2017143393 A | * | 12/2017 | ............ B62J 27/00 |
| WO | WO-2004046886 A2 | * | 6/2004 | ............ B60R 1/00 |
| WO | WO-2018025231 A1 | * | 2/2018 | ............ B60Q 1/38 |
| WO | WO-2019239402 A1 | * | 12/2019 | ............ B60K 35/00 |

* cited by examiner

Primary Examiner — Chico A Foxx
(74) Attorney, Agent, or Firm — Cramer Patent & Design, PLLC; Aaron R. Cramer

(57) ABSTRACT

A motorcycle integrated safety system comprises a taillight and headlight each having a camera and at least one sensor in electrical communication with a motorcycle's radio screen. The motorcycle integrated safety system also has plurality of heat, proximity, capacitive sensors, infrared sensors, or an ultrasonic sensors. Each sensor provides feedback to the motorcycle operator regarding the condition of the motorcycle and the environment in which the motorcycle is operating.

15 Claims, 5 Drawing Sheets

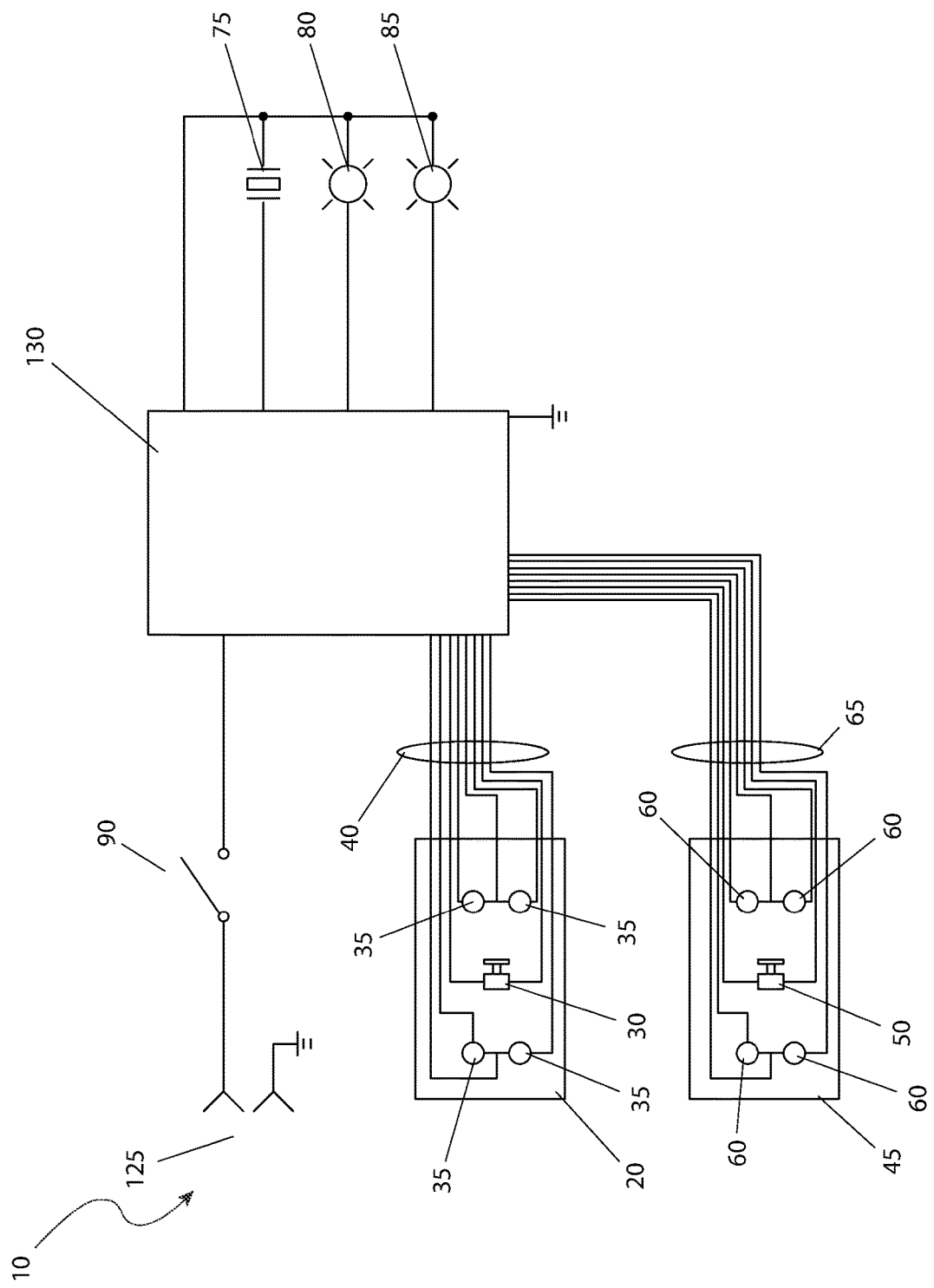

MOTORCYCLE INTEGRATED SAFETY SYSTEM

RELATED APPLICATIONS

None.

FIELD OF THE INVENTION

The present invention relates generally to a motorcycle integrated safety system.

BACKGROUND OF THE INVENTION

Motor vehicle accidents are among the leading causes of injury and death in the United States today. Many of these accidents and the injuries and deaths that occur as a result thereof, can be attributed to inadequate reaction time. The severity of the accident, whether it is poor weather, improper following distance, dangers from the side of the road, or the like, could usually be reduced or perhaps avoided entirely, if there were just a few more precious microseconds of reaction time. This increased reaction time is especially important for motorcycle riders, as the dynamic capabilities of motorcycles allow for faster acceleration times and handling.

Unfortunately, these capabilities make it easier for the motorcycle rider to get in trouble as well due to the fact that others may miscalculate the actions of the rider. Accordingly, there exists a need for a means by which motorcycle riders can be provided additional reaction time in an effort to improve safety. The development of the collision avoidance device for motorcycles fulfills this need.

SUMMARY OF THE INVENTION

To achieve the above and other objectives, the present invention provides for a collision avoidance device which has a first enclosure which also has an interior, a second enclosure which also has an interior, an audible alarm which alerts one or more operators or one or more riders of the motorcycle to a possible oncoming collision, a forward alert light which alerts the one or more operators or the one or more riders of the motorcycle that a possible collision has been detected by the first enclosure, a rearward alert light which alerts the one or more operators or the one or more riders of the motorcycle that a possible collision has been detected by the second enclosure, a power switch which applies or removes a plurality of electrical power from the collision avoidance device, and a processor which receives a plurality of input signals from the first enclosure via a first umbilical cable and from the second enclosure via a second umbilical cable. The first enclosure is capable of being fabricated within a front bumper of a motorcycle. The second enclosure is capable of being fabricated within a rear bumper of the motorcycle.

The first enclosure may be capable of being fabricated within a frame of the motorcycle. The first enclosure may be capable of being fabricated adjacent to a headlight of the motorcycle. The interior of the first enclosure may include a first video camera along with a plurality of first sensors. The first sensors may be selected from the group consisting of a plurality of heat sensors, a plurality of proximity sensors, a plurality of capacitive sensors, a plurality of infrared sensors, or a plurality of ultrasonic sensors. The second enclosure may be capable of being fabricated within a frame of the motorcycle. The second enclosure may be capable of being fabricated adjacent to a taillight of the motorcycle. The interior of the second enclosure may include a first video camera along with a plurality of second sensors.

The processor may be capable of predicting a plurality of outcomes of a possible collision with a plurality of additional inputs from the first sensors and the second sensors. The second sensors may be selected from the group consisting of a plurality of heat sensors, a plurality of proximity sensors, a plurality of capacitive sensors, a plurality of infrared sensors, or a plurality of ultrasonic sensors. The electrical power may be provided by a power source. The power source may be a motorcycle's electrical system. The processor may be capable of running a plurality of advanced algorithms capable of processing a plurality of video signals from the first video camera and the second video camera. The computer processor may generate a plurality of output signals to the audible alarm when a possibility of a collision exceeds a predetermined threshold, thus alerting the one or more operators or the one or more riders to take corrective action. The computer processor may generate a plurality of output signals to the forward alert light, when a possibility of a collision exceeds a predetermined threshold, thus alerting the one or more operators or the one or more riders to take corrective action. The computer processor may generate a plurality of output signals to the rearward alert light, when a possibility of a collision exceeds a predetermined threshold, thus alerting the one or more operators or the one or more riders to take corrective action.

The collision avoidance device may be adapted to be installed on the motorcycle. The collision avoidance device may be adapted to be an alerting system for the motorcycle to warn the one or more operators or the one or more riders of one or more potential collision dangers on a roadway upon which the motorcycle is travelling. The motorcycle may be equipped with the collision avoidance device which may include a forward-looking sensor range produced by the first enclosure. The motorcycle equipped with the collision avoidance device may include a rearward-looking sensor range produced by the second enclosure.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 5 is an electrical block diagram of the collision avoidance device, according to the preferred embodiment of the present invention.

DESCRIPTIVE KEY

Figure 1:
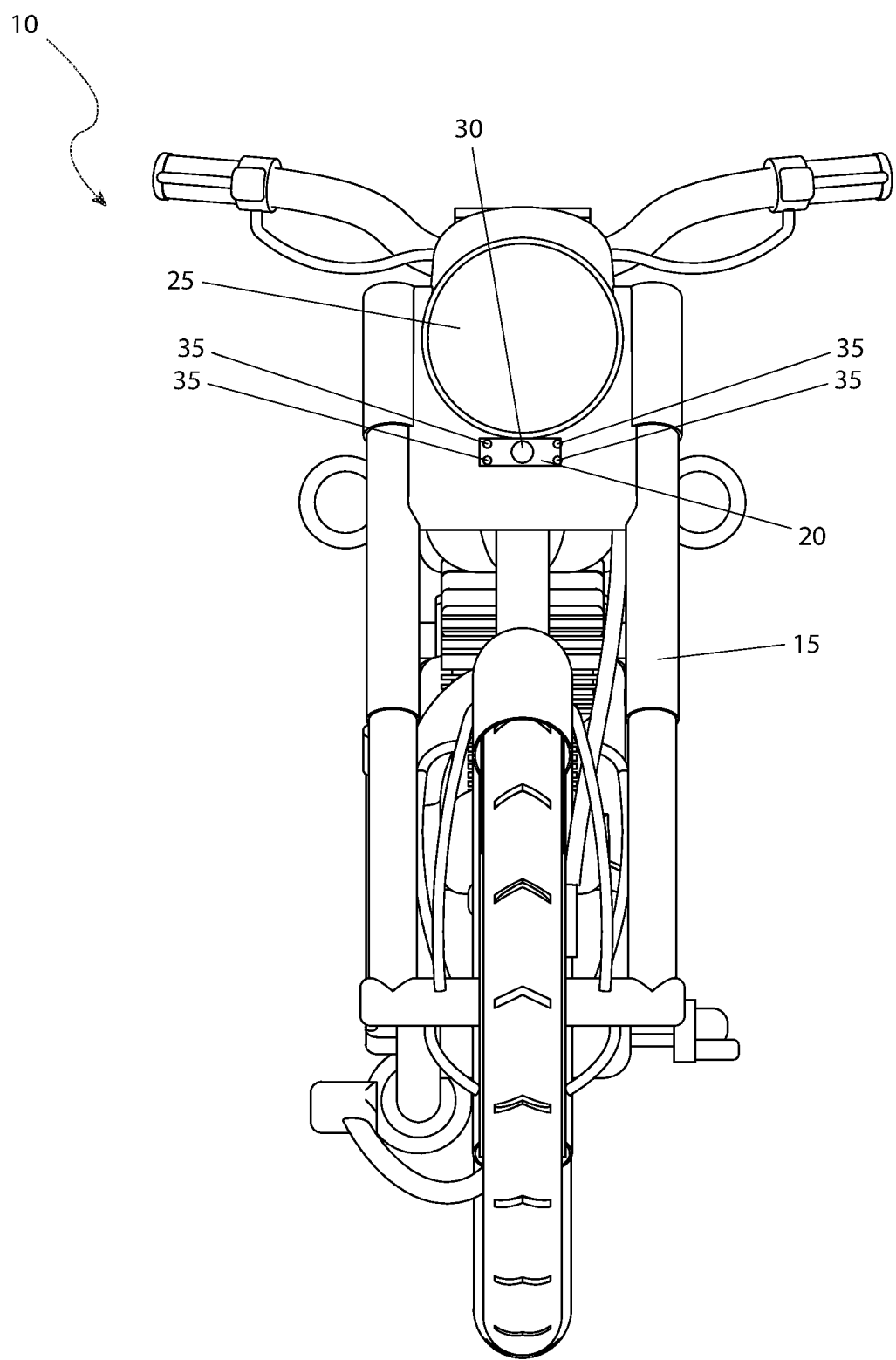
FIG. 1 is a front view of the collision avoidance device installed on a motorcycle, according to the preferred embodiment of the present invention.

10 collision avoidance device
15 motorcycle 20 first enclosure
25 headlight
30 first video camera
35 first sensor
40 first umbilical cable
45 second enclosure
50 motorcycle taillight
55 second video camera
60 second sensor
65 second umbilical cable
70 dashboard area
75 audible alarm
80 forward alert light
85 rearward alert light
90 power switch
95 roadway
100 forward-looking sensor range
105 rearward-looking sensor range
110 oncoming vehicle
115 crossing animal
120 approaching vehicle
125 power source
130 computer processor

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a front view of the collision avoidance device 10 installed on a motorcycle 15, according to the preferred embodiment of the present invention is disclosed. The collision avoidance device 10 (herein also described as the "device") 10, is an alerting system for motorcycles 15 to warn operators or riders of potential collision dangers on a roadway 95 upon which the motorcycle 15 is travelling. The device 10 is capable of being installed within a motorcycle 15 of any make, model, or style. The representation of the motorcycle 15 shown in FIG. 1 is for illustrative purposes only and the use of the device 10 on any particular make, model, or style of motorcycle is not intended to be a limiting factor of the present invention.

The device 10 provides for a first enclosure 20 capable of being fabricated within a front bumper or frame of the motorcycle 15, preferably near the headlight 25. The interior of the first enclosure 20 provides for a first video camera 30 along with a plurality of first sensors 35. The first sensors 35 are each envisioned as heat sensors, however other types of sensors such as proximity sensors, capacitive sensors, infrared sensors, ultrasonic sensors and the like could be used with equal effectiveness. As such the use of any particular style of sensor in the role of the first sensor 35 is not intended to be a limiting factor of the present invention. The electronics inside of the first enclosure 20 are connected to the remaining components of the device 10 via a first umbilical cable 40.

Figure 2:
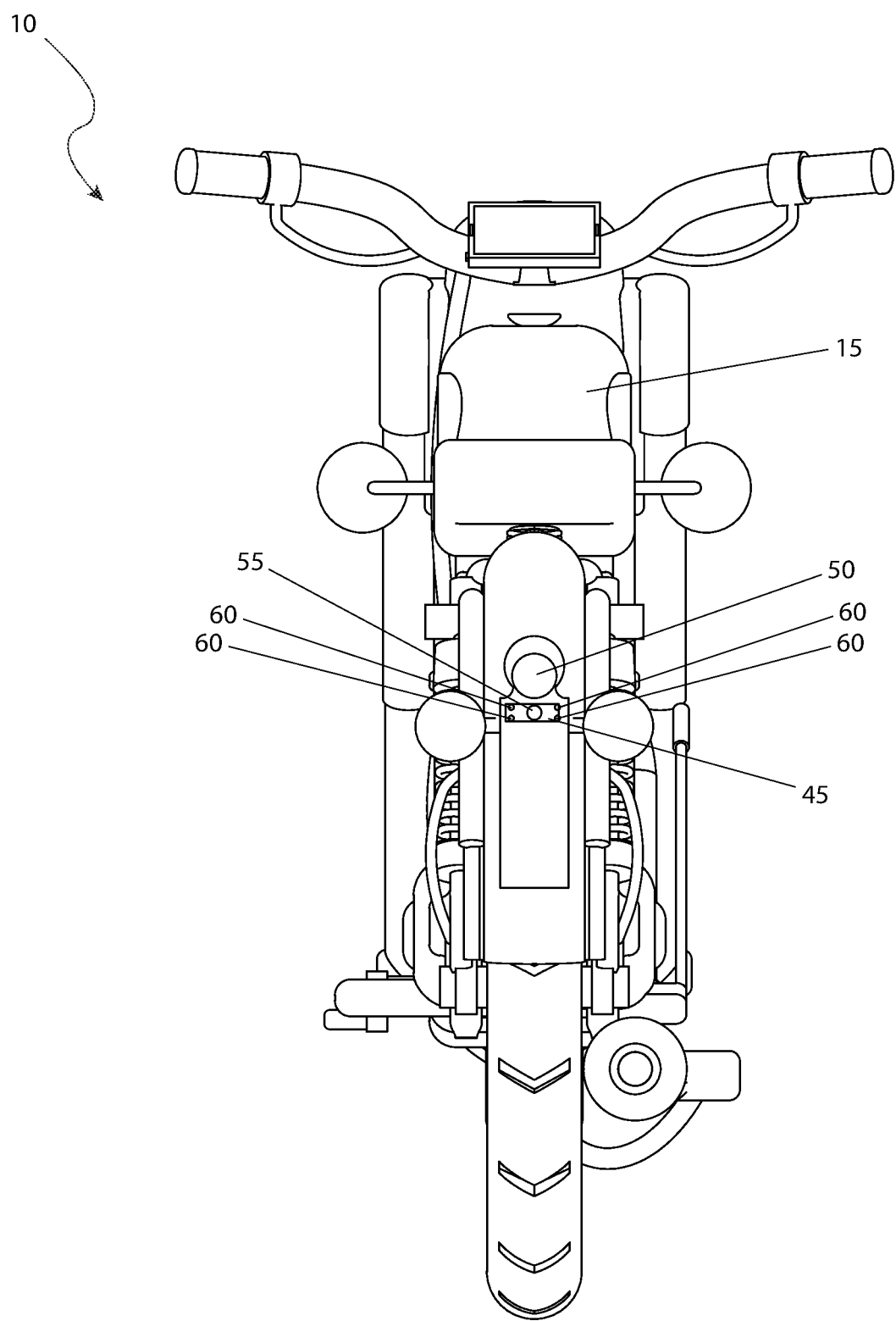
FIG. 2 is a rear view of the collision avoidance device installed on a motorcycle, according to the preferred embodiment of the present invention.

Referring next to FIG. 2, a rear view of the collision avoidance device 10 installed on a motorcycle 15, according to the preferred embodiment of the present invention is depicted. A second enclosure 45 is capable of being fabricated within a rear bumper or frame of the motorcycle 15, preferably near the motorcycle taillight 50. The interior of the second enclosure 45 provides for a second video camera 55 along with a plurality of second sensors 60. As aforementioned described, the use of any particular style of sensor in the role of the second sensors 60 is not intended to be a limiting factor of the present invention. The electronics inside of the second enclosure 45 are connected to the remaining components of the device 10 via a second umbilical cable 65.

Figure 3:
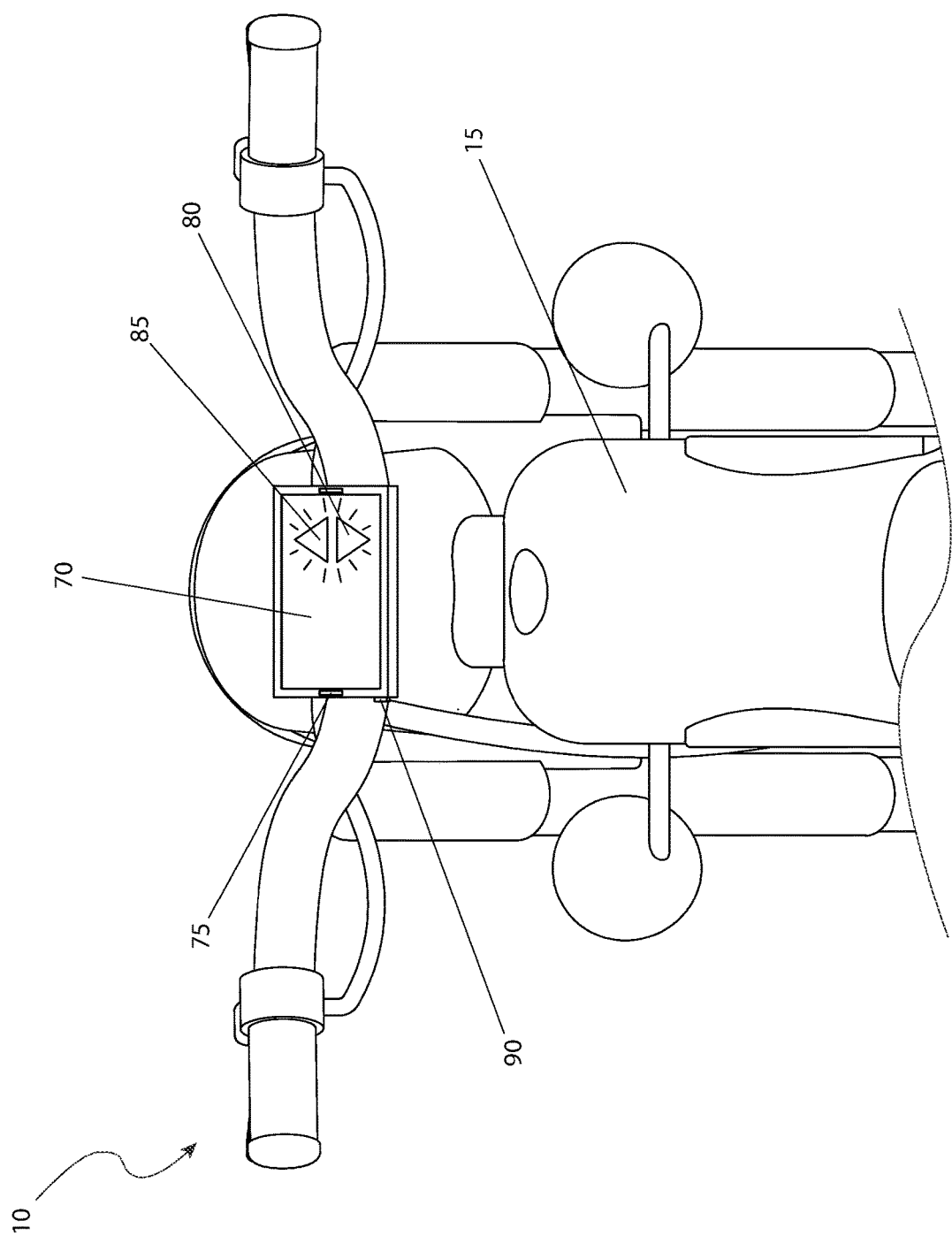
FIG. 3 is an overhead view of the collision avoidance device, shown in a utilized state while driving, according to the preferred embodiment of the present invention.

Referring now to FIG. 3, an overhead view of the collision avoidance device 10, shown in a utilized state while driving, according to the preferred embodiment of the present invention is shown. This figure discloses a dashboard area 70 as found with a typical motorcycle 15. An audible alarm 75 is provided to alert the operator or rider of the motorcycle 15 to a possible oncoming collision. A forward alert light 80 is provided to alert the operator or rider of the motorcycle 15 that a possible collision has been detected by the first enclosure 20 (as shown in FIG. 1). Likewise, a rearward alert light 85 is provided to alert the operator or rider of the motorcycle 15 that a possible collision has been detected by the second enclosure 45 (as shown in FIG. 2). A power switch 90 is provided to apply and remove electrical power from the device 10. The device 10 would be deactivated by the operator or rider of the motorcycle 15 should the functionality of the device 10 result in excessive alerts, or if the functionality of the device 10 is no longer needed.

Figure 4:
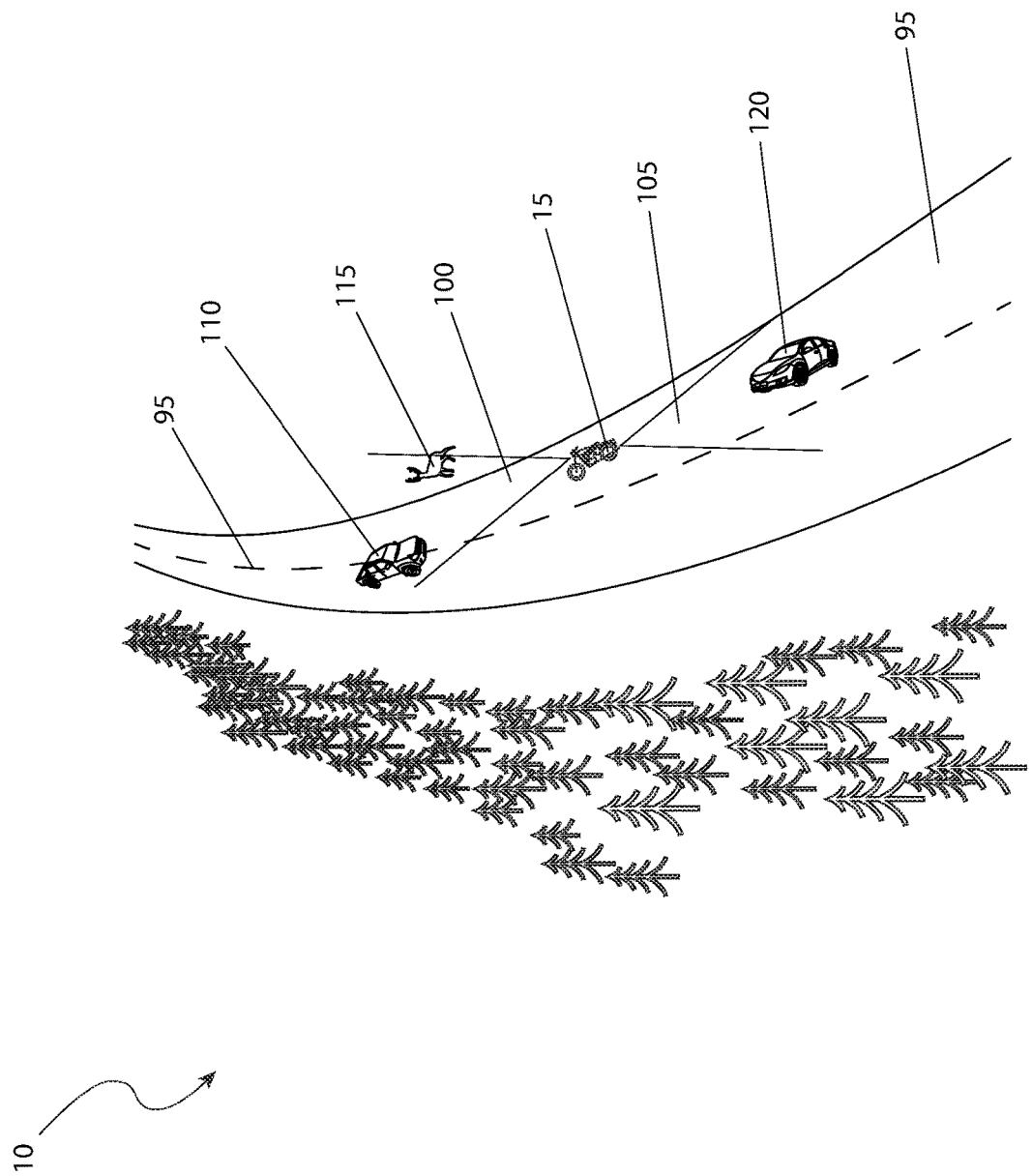
FIG. 4 is a perspective view of a roadway, equipped with the collision avoidance device, according to the preferred embodiment of the present invention.

Referring next to FIG. 4, a perspective view of a roadway 95, equipped with the collision avoidance device 10, according to the preferred embodiment of the present invention is disclosed. The roadway 95 is depicted as a conventional two-lane rural road for purposes of illustration. However, other types of roadways 95 including, but not limited to: highways, urban city streets, parking lot, drives, and the like will work equally well with the features of the device 10, and as such, should not be interpreted as a limiting factor of the present invention. The motorcycle 15 equipped with the device 10 provides for a forward-looking sensor range 100 as produced by the first enclosure 20 (as shown in FIG. 1) as well as a rearward-looking sensor range 105 as produced by the second enclosure 45 (a shown in FIG. 2). During operation of the device 10, various potential collisions such as an oncoming vehicle 110, a crossing animal 115 or an approaching vehicle 120 are detected and possibly alerted by the device 10. Other types of potential collisions such as pedestrians, bicyclists, merging traffic, suddenly stopping vehicles, debris in the roadway, accidental lane departures, stopped vehicles, and the like may also be alerted by the device 10.

Referring to FIG. 5, an electrical block diagram of the collision avoidance device 10, according to the preferred embodiment of the present invention is depicted. Electrical power for the power source 125 is provided by a power source 125, such as the electrical system of the motorcycle 15 (as shown in FIG. 1). Power is controlled by the power switch 90 to activate or deactivate the device 10 as aforementioned described. Resultant controlled power is then passed to a computer processor 130. Input signals to the computer processor 130 are provided from the first enclosure 20 via the first umbilical cable 40 and from the second enclosure 45 via the second umbilical cable 65. The computer processor 130 is envisioned to be a computer that is capable of running advance algorithms capable of processing video signals from the first video camera 30 and the second video camera 55 and with additional inputs from the first sensors 35 and the second sensors 60, is capable of predicting the outcomes of a possible collision. Should the possibility of a collision exceed a predetermined threshold, the computer processor 130 generates appropriate output signals to the audible alarm 75, the forward alert light 80, and the rearward alert light 85 thus alerting the operator or rider to take appropriate corrective action. Due to the modular design of the device 10 as depicted, it may be incorporated as standard or optional equipment on new motorcycle 15 or may installed as an aftermarket add-on kit on existing motorcycle 15.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 5. The user would procure the device 10 from conventional procurement channels such as motorcycle 15 manufacturers, parts suppliers, aftermarket specialty providers, electronic wholesalers, mail order and internet supply houses and the like. As aforementioned described, the device 10 would be provided as standard or optional equipment on new motorcycles 15 or made available as an add-on kit for existing motorcycles 15.

After procurement and prior to utilization, the device 10 would be prepared in the following manner: both the first umbilical cable 40 of the first enclosure 20 and the second umbilical cable 65 of the second enclosure 45 would be routed to the computer processor 130; the power source 125 would be connected to one (1) side of the power switch 90, the opposite side of the power switch 90 would be routed to the computer processor 130; and the audible alarm 75, the forward alert light 80 and the rearward alert light 85 would be routed to the computer processor 130. At this point in time, the device 10 is ready for utilization.

During utilization of the device 10, the following procedure would be initiated: should the alerting functionality of the device 10 be desired, the user would activate the power switch 90; the computer processor 130 would analyze the signals from the first video camera 30, the second video camera 55 the first sensors 35 and the second sensors 60 for indication of a possible collision; by comparing signals generated by moving and/or stationary objects and comparing them with present speed of the motorcycle 15 along with markings on the roadway 95, the device 10 would make a determination on the collision potential of multiple threats; should the threat level exceed a predetermined minimal level, the computer processor 130 will activate the audible alarm 75 along with the respective forward alert light 80 or rearward alert light 85 warning the operator or rider to quickly take corrective action. After the threat has passed or ceased, the computer processor 130 would reset ant continue operation in a repeating and cyclical manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A collision avoidance device, comprising:
   a first enclosure having an interior, the first enclosure capable of being fabricated within a front bumper of a motorcycle, wherein the interior of the first enclosure includes a first video camera along with a plurality of first sensors producing a forward-looking range for object detection;
   a second enclosure having an interior, the second enclosure is capable of being fabricated within a rear bumper of the motorcycle, wherein the interior of the second enclosure includes a second video camera along with a plurality of second sensors producing a rearward-looking range for object detection;
   an audible alarm alerting one or more operators or one or more riders of the motorcycle to a possible oncoming collision respectively detected by the first enclosure and/or the second enclosure;
   a forward alert light alerting the one or more operators or the one or more riders of the motorcycle that a possible collision with an object has been detected by the first enclosure;
   a rearward alert light alerting the one or more operators or the one or more riders of the motorcycle that a possible collision with an object has been detected by the second enclosure;
   a power switch applying or removing a plurality of electrical power from the collision avoidance device, wherein the power switch is electrically connected to a power source to enable the one or more operators or the one or more riders of the motorcycle to deactivate the collision avoidance device when excessive alerts have been produced; and
   a processor receiving a plurality of input signals, from the first enclosure via a first umbilical cable electrically connecting the first video camera along with the plurality of first sensors and from the second enclosure via a second umbilical cable electrically connecting the second video camera along with the plurality of second sensors, to enabling activation of the audible alarm, the forward alert light and the rearward alert light.

2. The collision avoidance device, according to claim 1, wherein the first enclosure is capable of being fabricated within a frame of the motorcycle.

3. The collision avoidance device, according to claim 1, wherein the first enclosure is capable of being fabricated adjacent to a headlight of the motorcycle.

4. The collision avoidance device, according to claim 1, wherein the first sensors are selected from the group consisting of a plurality of heat sensors, a plurality of proximity sensors, a plurality of capacitive sensors, a plurality of infrared sensors, or a plurality of ultrasonic sensors.

5. The collision avoidance device, according to claim 1, wherein the second enclosure is capable of being fabricated within a frame of the motorcycle.

6. The collision avoidance device, according to claim 1, wherein the second enclosure is capable of being fabricated adjacent to a taillight of the motorcycle.

7. The collision avoidance device, according to claim 1, wherein the processor is capable of predicting a plurality of outcomes of a possible collision with a plurality of additional inputs from the first sensors and the second sensors.

8. The collision avoidance device, according to claim 1, wherein the second sensors are selected from the group consisting of a plurality of heat sensors, a plurality of proximity sensors, a plurality of capacitive sensors, a plurality of infrared sensors, or a plurality of ultrasonic sensors.

9. The collision avoidance device, according to claim 1, wherein the power source is a motorcycle's electrical system.

10. The collision avoidance device, according to claim 1, wherein the processor is capable of running a plurality of advance algorithms capable of processing a plurality of video signals from the first video camera and the second video camera.

11. The collision avoidance device, according to claim 1, wherein when a possible collision exceeds a predetermined threshold the processor generates output signals to the audible alarm, thus alerting the one or more operators or the one or more riders to take corrective action.

12. The collision avoidance device, according to claim 1, wherein the processor generates a plurality of output signals to the forward alert light, when a possibility of a collision exceeds a predetermined threshold, thus alerting the one or more operators or the one or more riders to take corrective action.

13. The collision avoidance device, according to claim 1, wherein the processor generates a plurality of output signals to the rearward alert light, when a possibility of a collision exceeds a predetermined threshold, thus alerting the one or more operators or the one or more riders to take corrective action.

14. The collision avoidance device, according to claim 1, wherein the collision avoidance device is adapted to be installed on the motorcycle as an aftermarket add-on kit.

15. The collision avoidance device, according to claim 1, wherein the collision avoidance device is adapted to be an alerting system for the motorcycle to warn the one or more operators or the one or more riders of one or more potential collision dangers on a roadway upon which the motorcycle is travelling.

* * * * *